2,167,088

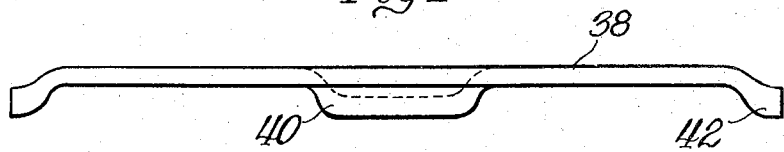
Fig. 1
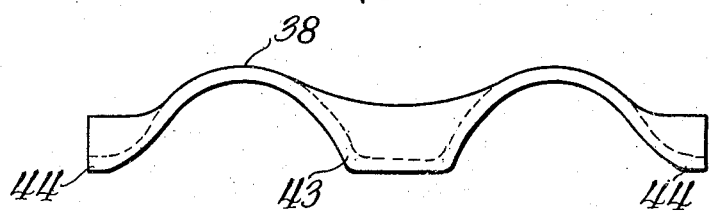
Fig. 2
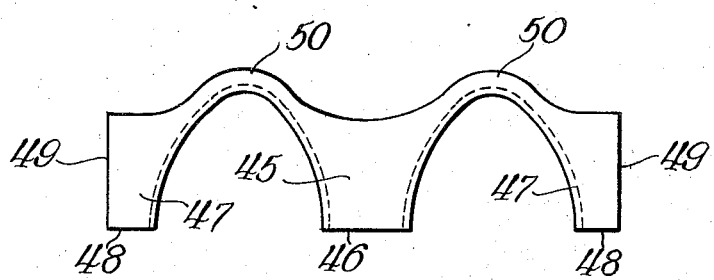
Fig. 3
Fig. 4
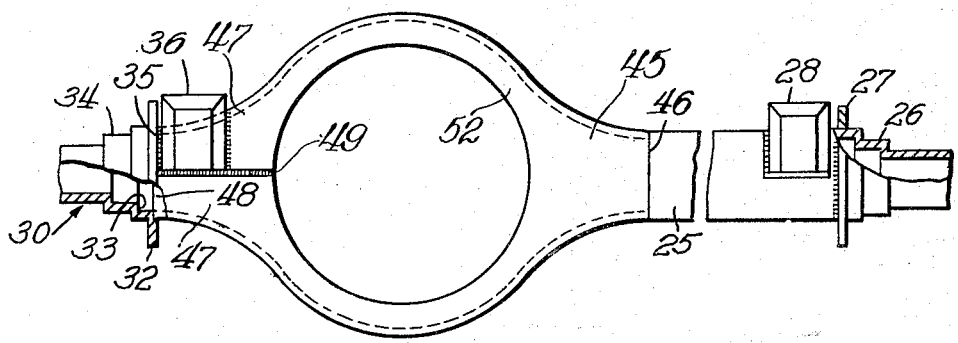
Inventor
Walter E. Schirmer
By Brown Jackson Boettcher Dienner
Attys Patented July 25, 1939

UNITED STATES PATENT OFFICE 2,167,088

AXLE HOUSING AND METHOD OF MAKING SAME

Walter E. Schirmer, Chicago, Ill., assignor to Clark Equipment Company, Buchanan, Mich., a corporation of Michigan Application March 5, 1937, Serial No. 129,156

5 Claims. (Cl. 29—153.1)

This invention relates to axle housings and the method of forming the same, and is more particularly directed to the formation of a rear axle housing for vehicles such as automobiles, trucks, buses, tractors and the like.

It has been proposed heretofore to form axle housings from a tubular blank, which is centrally slotted and expanded to form a differential housing, and then swaged down along the extending arm portions and upset at the ends to form wheel bearing seats and the like. It has also been contemplated to form such housings by expanding one end of a tubular blank into a half section of a differential casing and upset the other end of the blank to form a wheel and brake mounting portion, and to then join two such blanks to form the completed housing.

The present invention contemplates forming an axle housing from three pieces of flat sheet stock, in the case of truck and passenger car housings, and from flat blanks and a forging in the case of bus housings or other housings where the differential is offset with respect to the longitudinal center of the housing.

It is a primary object of the present invention to form the differential housing, preferably of the banjo type, from flat sheet stock by a series of drawing or stamping operations, the formed blank being then rolled into a hoop, flanged and welded to produce a central banjo frame housing having oppositely extending tapered throat portions to which are secured the arms forming the completed housing.

In the preferred method of forming the banjo casing, the blank is operated upon in such manner as to form one throat portion at the center thereof, and complementary throat portions at the ends which, when folded around, are joined to complete the other throat portion.

Another feature provided by the present invention resides in the construction of a banjo type casing which can be employed as standard in a number of housing designs, whether they be for automobile, truck, tractor or bus construction.

Still another advantage of the present invention is the elimination of the expensive and difficult expanding operations heretofore required in forming fabricated axle housings of the banjo type, and the provision of a simplified and inexpensive housing construction capable of meeting the requirements of this type of structure.

Other objects and advantages of the present invention will appear more fully in the following detailed description which, taken in conjunction with the accompanying drawing, will disclose to those skilled in the art the particular construction of the housing and the method employed in a preferred embodiment of the present invention.

In the drawing:

Figure 1 is a view showing an initial drawing operation on a blank such as used for forming the banjo casing;

Figure 2 illustrates a succeeding drawing operation;

Figure 3 illustrates the final drawing operation upon the blank shown in Figure 1; and Figure 4 illustrates a complete housing including the banjo frame formed from the blank shown in Figure 3.

The rectangular blank 38, which may be of flat boiler plate stock or the like, is first subjected to a drawing operation which produces the depression 40 at the central portion thereof, and produces complementary end depressions 42 at opposite ends of the blank 38. The succeeding drawing operation increases the depth of the depression 40 to an extent such as indicated at 43 in Figure 2, and correspondingly increases the depth of the complementary end portions 42 as indicated at 44. This in turn decreases the longitudinal extent of the blank 38 due to the fact that metal is being moved inwardly to accommodate the displacement of the metal downwardly in the depressed portions 43 and 44.

The final drawing operation is illustrated in Figure 3 in which the central portion of the blank has been so worked as to provide a throat portion 45 terminating in a cylindrical end portion 46. At the same time, the end portions of the blank 38 have been deformed to form complementary throat portions 47 terminating in semi-cylindrical end portions 48, and in complementary edge portions 49 defining the semi-cylindrical portions 48.

The blank is then subjected to a rolling operation which moves the complementary throat portions 47 toward each other until the edges 49 are in abutment whereby the semi-cylindrical end portions 48 cooperate to produce a cylindrical opening corresponding to the opening 46 of the throat portion 45. The abutting edges 49 are welded on opposite sides of the housing to secure the same together and to form the complete banjo frame. At the same time, the intermediate portions 50 of the blank shown in Figure 3 are subjected during the rolling operation to deformation so that parallel radial flanges 52 are formed on opposite sides of the banjo frame, and define therebetween a cylindrical web portion 53 indicated in dotted lines in Figure 4 and forming the enclosing portion of the banjo frame.

The frame as thus formed, may be fabricated into a complete axle housing by the addition of arms secured to the ends 46 and 48 of the frame in a manner such as shown in the Mogford and Spatta Patent No. 1,978,685 of October 30, 1934. In Figure 4 I have illustrated a particular type of axle housing which may be formed with the banjo construction of the present invention. The housing herein illustrated is particularly adapted for use in bus constructions in which it is desired that the differential housing be offset from the longitudinal center of the vehicle in order to provide the proper drive clearances. In this housing one of the throat portions 46 of the banjo has secured thereto the housing arm 25 which is relatively long and is formed at its outer end to provide wheel bearing seats, indicated generally at 26, for receiving wheels connected to the axle shafts of an assembly of the full floating type. A suitable brake flange 27 is welded to the periphery of the arm adjacent the bearing seats 26, and adjacent the brake flange 27 I preferably provide a spring pad 28 welded to the arm in any desired manner.

The opposite throat portion 48 of the banjo frame housing is adapted to receive a forging 30. This forging is provided with an enlarged brake plate flange 32 having an annular shoulder formed in the radial face thereof, as indicated at 33. This shoulder is adapted to receive the defining edge of the opening at the end of the throat portion 48 of the banjo housing, and centers the forging 30 on the banjo frame. The forging 30 is provided with wheel bearing seats 34 corresponding to the seats 26 provided at the end of the arm 25, and is secured to the throat portion of the housing by the circumferential weld indicated at 35. Mounted over the upper portion of the periphery of the throat 47 and adjacent the brake flange 32 is a spring pad 36 similar in construction to the spring pad 28, except that its internal periphery is formed to seat on the tapered throat 47, and is to be welded thereto instead of a cylindrical arm such as the arm 25. This provides a very rugged and sturdy housing construction which may be easily fabricated and assembled, and which meets all the requirements for such a housing. If a construction such as shown in Figure 4 is employed, it is preferable to mount the forging 30 at the welded end 48 of the throat portion 47 in order that the hub strength of the forging 30 can be employed for reinforcing the weld along the abutting edges 49.

It is therefore apparent that with the invention thus disclosed, a complete banjo frame can be formed from a single sheet metal blank without the difficulties of former methods of forming banjo frames, such as by expanding the central slotted portion of a tubular blank or expanding the split end of a tubular arm.

It is of course apparent that in the drawing operations on the blank the depressed sections for forming the throats of the banjo frame may be polygonal in section as well as oval or cylindrical, and in such case the tubular arms secured thereto will of course be of corresponding section except for the wheel bearing portions at the extremities thereof.

I do not intend to be limited to the exact details of the drawing operations and assembly herein shown and described, but only insofar as defined by the scope and spirit of the appended claims.

I claim:

1. The method of forming an axle housing which comprises providing a tubular blank, subjecting said blank to a series of drawing operations to form a central frusto-conical throat portion and complementary half-throat portions at the ends of the blank, rolling the formed blank into a hoop to bring said complementary portions together to form a second throat portion extending oppositely to said first throat portion, and securing axle arms to the throat portions thus formed.

2. As an article of manufacture, a unitary central banjo frame portion for an axle housing formed from a flat blank, and comprising oppositely extending throat portions, one of said throat portions being formed by complementary end portions of the blank welded together along the abutting edges thereof, and the other throat portion being formed as a tapered projection extending transversely of the center of the blank.

3. As an article of manufacture, a rear axle housing having a flat blank formed into a unitary central banjo frame portion provided with oppositely extending tapered throat portions, one of said throat portions comprising complementary formed ends of the blank welded together, a tubular arm secured to the other of said throat portions and having thickened bearing seat portions at its outer extremity, and a forged tubular element secured about the defining edge of said one throat portion and having thickened bearing seat portions, said forged element being provided with a radially extending brake flange positioned substantially in the plane of the junction between the throat portion and the element.

4. The method of forming the banjo portion of a rear axle housing from a rectangular flat blank which comprises initially drawing said blank to form a centrally depressed throat forming portion and depressed complementary throat forming end portions, further drawing the blank to impart a generally longitudinal channel shape thereto with said depressed portions increased in depth, then rolling said blank in a direction reverse to said drawing operations to bring said complementary portions together and to form a circular inturned channel-shaped blank with said throat forming portions extending in opposite directions and welding the meeting edges of said complementary portions.

5. A method of forming the banjo and throat portions of a rear axle housing from a rectangular flat blank which comprises subjecting the blank to a series of drawing operations to form a central frusto-conical throat portion having complementary half throat portions at the ends of the blank, said operations simultaneously producing channel-shaped connecting portions therebetween, rolling said blanks at said channel shaped portions in a direction to turn said channels inwardly and to bring said half throat end portions together to form a second throat portion extending oppositely to said first throat portion, and welding said half throat portions together along the meeting edges thereof.

WALTER E. SCHIRMER.